United States Patent [19]

Knutson et al.

[11] Patent Number: 5,526,378
[45] Date of Patent: Jun. 11, 1996

[54] BLIND MULTIPATH CORRECTION FOR DIGITAL COMMUNICATION CHANNEL

[75] Inventors: Paul G. Knutson, Indianapolis; Dong-Chang Shiue, Carmel, both of Ind.

[73] Assignee: Thomson Consumer Electronics, Inc., Indianapolis, Ind.

[21] Appl. No.: 355,944

[22] Filed: Dec. 14, 1994

[51] Int. Cl.$^6$ ......................................... H03H 7/30
[52] U.S. Cl. ........................... 375/229; 333/18; 333/28 R
[58] Field of Search ..................................... 375/229, 232, 375/233, 230; 364/724.19, 724.2; 333/18, 28 R

[56] References Cited

U.S. PATENT DOCUMENTS

| | | | |
|---|---|---|---|
| 4,698,680 | 10/1987 | Lewis, Jr. et al. | 358/166 |
| 4,847,797 | 7/1989 | Picchi et al. | 364/724.2 |
| 5,134,464 | 7/1992 | Basile et al. | 358/12 |
| 5,263,033 | 11/1993 | Seshadri | 375/232 |
| 5,282,225 | 1/1994 | Nikias et al. | 375/232 |
| 5,283,813 | 2/1994 | Shalvi et al. | 375/230 |
| 5,347,541 | 9/1994 | Iltis et al. | 375/230 |
| 5,379,268 | 1/1995 | Hutson | 367/100 |
| 5,432,816 | 7/1995 | Gozzo | 375/232 |

OTHER PUBLICATIONS

*Simulation and Implementation of US QAM–Based HDTV Channel Decoder,* Tianmin Liu et al., Samsung and Jian Yang et al., Univ. of PA, IEEE Transactions on Consumer Electronics, vol. 39, No. 3, Aug. 1993.

*Adaptive Blind Equalization Coupled with Carrier Recovery for HDTV Modem,* Choi, et al., IEEE Transactions on Consumer Electronics, vol. 39, No. 3, Aug. 1993.

*Joint Blind Equalization, Carrier Recovery, and Timing Recovery for High–Order QAM Signal Constellations,* Neil K. Jablon, IEEE Transactions on Signal Processing, vol. 40, No. 6, Jun. 1992.

*Digital Communication,* Lee and Messerschmitt (Kluwer Academic Press, 1988) at pp. 371–373.

Primary Examiner—Stephen Chin
Assistant Examiner—Huong Luu
Attorney, Agent, or Firm—Joseph S. Tripoli; Eric P. Herrmann; Ronald H. Kurdyla

[57] ABSTRACT

A blind multipath equalizer for a digital communication channel is disclosed. The equalizer includes a sparse digital filter, responsive to a source of a received signal including a digital data signal, and including a plurality of taps, each responsive to a tap coefficient and time displacement, which produces a multipath corrected digital output signal. A filter controller is responsive to the received signal for detecting a multipath signal by calculating the autocorrelation of the received signal, detecting a multipath signal based on the autocorrelation and supplying a tap coefficient and time displacement to one of the plurality of taps to cancel the detected multipath signal.

20 Claims, 3 Drawing Sheets

BLIND MULTIPATH CORRECTION FOR DIGITAL COMMUNICATION CHANNEL

FIELD OF THE INVENTION

The present invention relates to a blind multipath correcting equalizer for use in a high capacity digital communication channel such as will be required for an advanced digital television (ADTV) broadcast or cable channel.

DESCRIPTION OF THE PRIOR ART

Terrestrial high definition television (HDTV) systems have been proposed using quadrature amplitude modulation (QAM) with a constellation of 32 symbols (a 32QAM system), and with as high as a 256 symbol constellation (a 256QAM system) proposed for future systems. Alternatively, an 8 level vestigial sideband (VSB) modulation scheme has been proposed for a terrestrial broadcast ADTV system and a 16 level VSB modulation scheme for a cable ADTV system. The modulation schemes used by such high capacity digital communication channels require high quality reproduction of the received signal. In particular, uncorrected multipath (ghost) signals can degrade the received signal to the point where the transmitted symbols cannot be recreated and communications is impossible.

Proposed ADTV systems use a conventional decision feedback equalizer (DFE) to correct the received signal for the effects of both multipath and intersymbol interference. For example, a proposed DFE includes a 128 tap filter, having complex taps, in which the complex coefficients of the taps are adjusted using a least mean square (LMS) algorithm. Such a filter provides ghost cancellation in a time displacement range of up to 25 sec, depending upon the magnitude of the ghost signal the larger the magnitude of the ghost, the larger the delay necessary to sufficiently attenuate it, and the closer in time it must be to the main signal. However, because ghost signals can occur at larger time displacements from the main signal than can be corrected by the proposed 128 tap FIR DFE filter, the use of such a filter will not sufficiently correct for the severity of multipath interference which is experienced in the communication channels. One possible solution is to include more taps in the DFE, but this is an expensive solution. Furthermore, the LMS algorithm converges slowly. The presence of a rapidly changing ghost signal (such as airplane flutter) will not be corrected by such a system, regardless of the number of taps in the FIR filter.

To provide multipath correction, some current NTSC receivers include an FIR and IIR filter to correct for ghost signals occurring at larger time displacements from the main signal than is possible by the above DFE. In these receivers, a training signal is used to characterize the ghost signals. For example, a portion of the vertical synchronization signal may be used as a training signal. Ghosts of this training signal are detected in the received signal, and the time displacement and magnitude and phase of the ghost signal are determined. From this data, the time location, and tap coefficient of a compensating tap in the sparse FIR and/or IIR filter may be specified, thus, canceling the ghost signal. Such a system can correct a relatively large magnitude ghost signal at a relatively large time displacement from the main signal, and can react quickly to cancel a rapidly changing ghost signal. However, in an ADTV signal, there may be no training signal to determine the time displacement and magnitude of a ghost signal.

A multipath ghost signal cancellation system which will permit the cancellation of potentially rapidly changing ghost signals at relatively large time displacements from the main signal in an ADTV system, without requiring a very large and expensive DFE filter, or a training signal, is desirable.

SUMMARY OF THE INVENTION

In accordance with principles of the present invention, a blind multipath equalizer for a digital communication channel includes a sparse digital filter, responsive to a received signal including a digital data signal, and including a plurality of taps, each responsive to a tap coefficient and time displacement, which produces a multipath corrected digital output signal. A filter controller is responsive to the received signal for detecting a multipath signal by calculating the autocorrelation of the received signal, detecting a multipath signal based on the autocorrelation, and supplying a tap coefficient and time displacement to one of the plurality of taps to cancel the detected multipath signal.

DESCRIPTION OF THE PREFERRED EMBODIMENT

Figure 1:
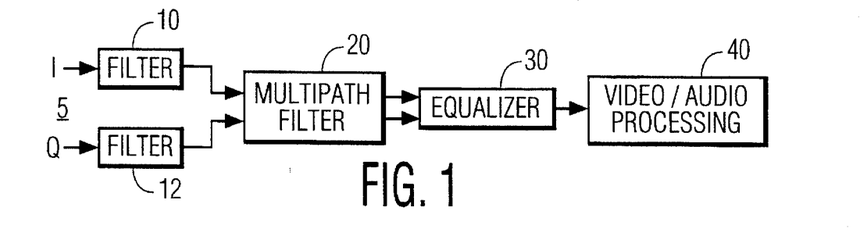
FIG. 1 is a block diagram of a portion of an advanced digital television receiver including a blind multipath equalizer according to principles of the present invention.

FIG. 1 is a block diagram of a portion of an advanced digital television receiver including a blind multipath equalizer according to principles of the present invention. The disclosed blind multipath equalizer will be described below as embodied in a QAM system. One skilled in the art of advanced digital television and digital communication systems design will understand how to embody the blind multipath equalizer in a VSB system. In FIG. 1, a front-end of the receiver (not shown) is coupled to an input terminal 5. The front-end of the receiver may include a tuner and intermediate frequency (I.F.) stage, an analog-to-digital converter, and 90– phase shifter (none of which are shown), coupled together in a known manner to produce intermediate frequency in-phase (I) and quadrature (Q) received signals. The front-end of the receiver may also include a timing reference generator and a clock recovery circuit (also not shown), coupled together in a known manner, to produce the various clock signals required by the various circuitry in the receiver in synchronism with the received signal. It is also possible for the timing reference generator and clock recovery circuit to be located after the blind multipath equalizer (described below).

The I and Q input terminals of input terminal 5 are coupled to pulse shaping filters 10 and 12, respectively. The filters 10 and 12 are square root Nyquist filters of known arrangement. The pulse shaping filters 10 and 12 are coupled to a serial connection of a blind multipath equalizing filter 20, an FIR decision feedback equalizer 30 and video and audio processing circuitry 40.

In operation, the pulse shaping filters 10 and 12 supply digital signals of known characteristics to the remainder of the receiver for processing. The blind multipath equalizing filter 20 analyzes its input signals, and processes those signals to cancel multipath ghost signals. The multipath filter 20 will be described in more detail below. The deghosted signals are then processed by the FIR equalizer 30 to eliminate intersymbol interference effects introduced by the transmission channel and possibly by the multipath filter 20. Although illustrated as an equalizer alone, the equalizer 30 includes the 128 tap DFE filter (with associated coefficient control circuit), a derotator (with associated phase controller), a low pass filter, a digital demodulator, a slicer, a decoder, and an error detector coupled between the slicer and the coefficient control circuit and phase controller (none of which are shown); all arranged in a known manner to produce multibit digital words representing the received television signal. As described above, the illustrated FIR equalizer may also include the timing reference generator and clock recovery circuit. The video and audio processing circuitry 40 processes the multibit digital words from the FIR equalizer 30 to produce the video image and audio sounds on a display screen and speakers, respectively. Alternatively, the video and audio processing circuitry 40 may provide video and audio representative signals to other circuitry, such as a video cassette recorder.

Figure 2:
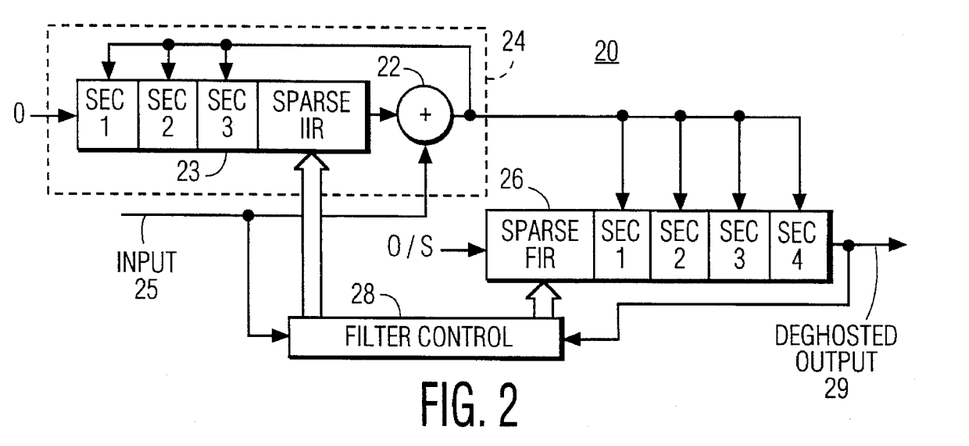
FIG. 2 is a more detailed block diagram of the blind multipath equalizer illustrated in FIG. 1.

FIG. 2 is a more detailed block diagram of the blind multi-path equalizing filter 20 illustrated in FIG. 1. In FIG. 2, thin signal lines carry complex multibit digital data signals, which in the present embodiment comprise successive complex data samples made up of a real and an imaginary component, each being a ten-bit, two's complement digital number. The real component is illustrated in FIG. 1 as the I signal, and the imaginary component as the Q signal. Signal lines illustrated by wide arrows carry tap coefficient values, which in the illustrated embodiment are also complex values made up of a real and an imaginary component, each being a ten-bit, two's complement digital number, and time displacement values, which in the illustrated embodiment are real integer values between 1 and 152. All components illustrated process complex samples, unless explicitly stated otherwise.

In FIG. 2, an input terminal 25 is coupled to a first input terminal of a complex adder 22, and to a first input terminal of a filter control circuit 28. An output terminal of the adder 22 is coupled to respective input terminals of a plurality of filter sections 23 (SEC1–SEC 3). The combination of the adder 22 and the filter sections 23 forms a sparse IIR filter 24, constructed in a known manner. The output terminal of adder 22 is also coupled to a plurality of filter sections (SEC1–SEC4) of a sparse FIR filter 26, also constructed in a known manner. An output terminal of the plurality of filter sections 23 is coupled to a second input terminal of the complex adder 22. An output terminal of the sparse FIR filter 26 is coupled to an output terminal 29 of the multipath filter 20 and to a second input terminal of the filter control circuit 28. A zero-valued signal is coupled to a summation input terminal of the sparse IIR filter 24, and an offset (O/S) signal (which may also be a zero-valued signal) is coupled to a summation input terminal of the sparse FIR filter 26. Respective filter control output terminals of the filter control circuit 28, which may include a known digital signal processor (DSP) or microprocessor (P) (not shown), are coupled to control input terminals of the sparse IIR filter 24 and the sparse FIR filter 26.

In operation, the DSP in the filter control circuit 28 analyzes the signal from the input terminal 25 to detect multi-path interference ghost signals. When the magnitude and phase of a ghost signal, and its time displacement, are determined by the DSP, control signals are generated for the sparse IIR filter 24 and sparse FIR filter 26 to condition them to attenuate the ghost signal. As is known, pre-ghosts (multipath signals which arrive at the receiver before the main signal) are attenuated by allocating a tap in the sparse FIR filter 26 located at an appropriate time displacement and having an appropriate tap coefficient; and post-ghosts (which arrive at the receiver after the main signal) are attenuated by similarly allocating a tap in the sparse IIR filter 24. Algorithms for calculating appropriate time displacements and tap coefficients of allocated taps from the time displacement and magnitude and phase of the ghost signal are known.

As described above, in current NTSC receivers, the magnitude and phase of a ghost signal are determined through the use of a training signal located in the vertical synchronization period of a video signal. However, in an ADTV signal, there may be no such training signal which may be used to detect ghost signals. However, the inventors have realized that an ADTV signal comprises successive blocks of data each containing a fixed predetermined number of symbols; that the channel has high entropy, i.e. the ADTV signal is a highly random signal because the data it represents has been compressed, digitized, Huffman encoded, packetized, Reed-Solomon encoded, scrambled and forward-errorcorrection-coded; and that the blocks are all of a fixed predetermined length. The inventors have further realized that an autocorrelation performed on such a signal will produce data indicating the time displacement and magnitude and phase of any multipath ghost signals existing in the input signal.

Figure 3:
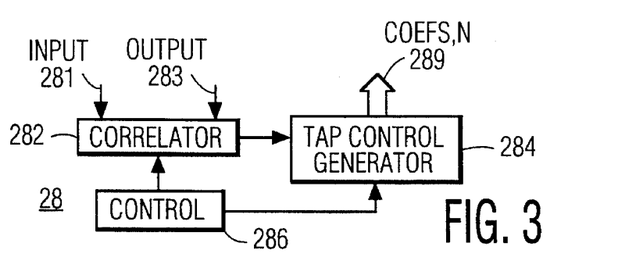
FIG. 3 is a more detailed block diagram of the filter control circuit for the blind multipath equalizer illustrated in FIG. 2.

FIG. 3 is a more detailed block diagram of the filter control circuit 28 for the blind multipath equalizer 20 illustrated in FIG. 2. In FIG. 3 a first data input terminal 281 is coupled to receive data from the input terminal 25 of the multipath filter 20 (of FIG. 2), and a second data input terminal 283 is coupled to receive data from the output terminal 29 of the multipath filter 20. The first data input terminal 281 and second data input terminals are coupled to respective input terminals of a correlator 282. An output terminal of the correlator 282 is coupled to an input terminal of a tap control signal generator 284. An output terminal of the tap control signal generator 284 is coupled an output terminal 289 of the filter control circuit 28. Output terminal 289 supplies data to the respective control input terminals of the sparse IIR filter 24 and sparse FIR filter 26 defining complex tap coefficients (COEFS) and time displacements (N) for allocated taps in these filters. A control circuit 286, which may comprise a DSP, is coupled to respective control input terminals of the correlator 282 and tap control signal generator 284.

In operation, the correlator 282 can selectively calculate an autocorrelation of the signal at the first input terminal 281, an autocorrelation of the signal at the second input terminal 283, or a cross correlation of the signal at the first input terminal 281 with the signal at the second input terminal 283, as commanded by the control circuit 286. For example, if the correlator 282 calculates the autocorrelation of the signal at the first input terminal 281 (i.e. the received signal), it generates an output signal having a main peak representing the main signal. If a multipath ghost signal is present in the received signal, the output signal will further include another peak, representing the ghost signal, in which the time displacement of the peak relative to the main signal peak represents the time displacement of the ghost signal from the main signal, and the complex value of the peak represents the magnitude and phase of the ghost signal. Other ghost signals will produce other corresponding peaks. The output signal from the correlator 282 is processed by the tap control signal generator 284, which analyzes the autocorrelation result, and allocates taps in the sparse IIR filter 24 and sparse FIR filter 26 with appropriate time displacements and tap coefficients in a manner described in more detail below. Signals which will configure the sparse IIR filter 24 and sparse FIR filter 26 to allocate the indicated taps are generated by the tap control signal generator 284.

Figure 4:
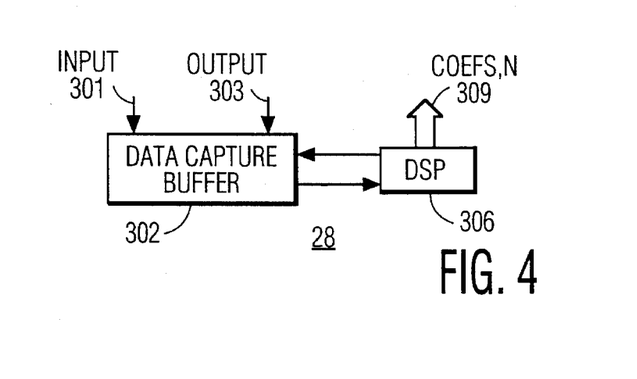
FIG. 4 is a block diagram of an embodiment of a filter control circuit in which all calculations necessary to generate complex tap coefficients and time displacements are performed by a digital signal processor.
Figure 5:
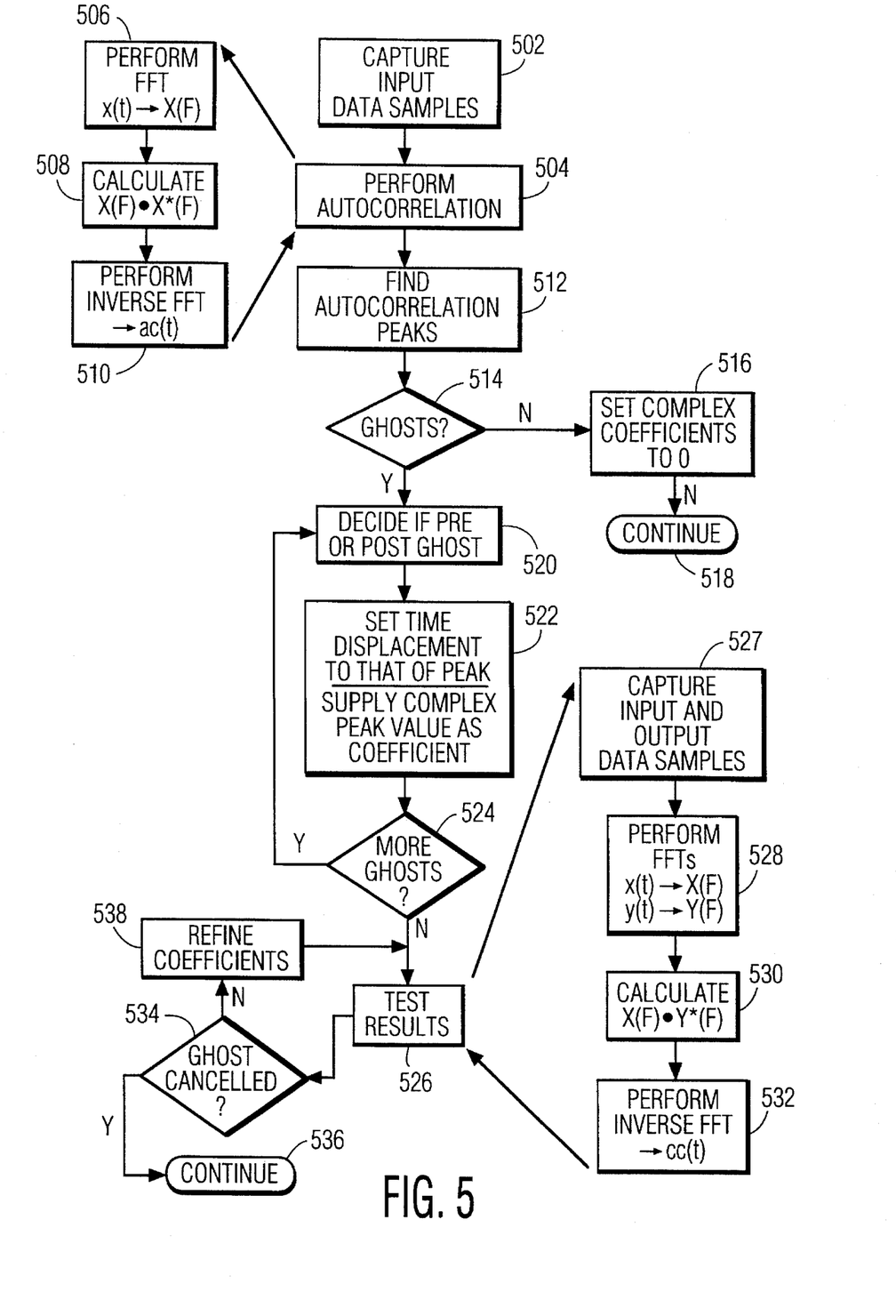
FIG. 5 is a flow diagram illustrating the process of calculating the complex tap coefficients and time displacements of the blind multipath equalizer illustrated in FIG. 2.

FIG. 4 is a block diagram of an embodiment of a filter control circuit 28 in which all calculations necessary to generate complex tap coefficients and time displacements are performed by a DSP, and FIG. 5 is a flow diagram illustrating the process of calculating the complex tap coefficients and time displacements. In FIG. 4, a first data input terminal 301 is coupled to receive data from the input terminal 25 of the multipath filter 20 (of FIG. 2) and a second data input terminal 303 is coupled to receive data from the output terminal 29 of the multipath filter 20. The first data input terminal 301 and the second data input terminal 303 are coupled to respective input terminals of a data capture buffer 302. In a preferred embodiment, the data capture buffer 302 has capacity to extract and store 2048 complex samples from the input signal at input terminal 301, and simultaneously extract and store 2048 complex samples from the output signal at input terminal 303. An output terminal of the data capture buffer 302 is coupled to a data input terminal of a DSP 306. A data output terminal of the DSP 306 is coupled an output terminal 309 of the filter control circuit 28. The output terminal 309 supplies data to the respective control input terminals of the sparse IIR filter 24 and sparse FIR filter 26 defining complex tap coefficients (COEFS) and time displacements (N) for allocated taps in these filters. A control output terminal of the DSP 306 is coupled to a control input terminal of the data capture buffer 302, and controls the extraction and storage of data samples from the respective data input terminals 301 and 303.

The operation of the filter control circuit illustrated in FIG. 4 may be better understood by reference to FIG. 5. All mathematical operations are complex operations, unless explicitly stated otherwise. In FIG. 5, the process is begun in step 502 in which the DSP 306 commands the data capture buffer 302 to extract and store 2048 complex samples from the input of the multipath equalizer 20 (of FIG. 2) through input terminal 301. In step 504, the autocorrelation of the input samples just captured is calculated. There are three steps performed in calculating the autocorrelation of the input samples. First, in step 506, the DSP retrieves the 2048 captured input samples representing the time domain input signal x(t) from the data capture buffer and transforms them to the frequency domain by performing a fast Fourier transform (FFT) on them in a known manner, to generate the frequency spectrum X(F) containing 2048 complex samples. Then, in step 508, the product of the frequency spectrum X(F) and its complex conjugate X*(F): X(F) X*(F) is calculated by the DSP 306. In step 510, this product is then inverse transformed by the DSP 306 back into the time domain from the frequency domain by performing a second FFT to produce the time autocorrelation ac(t) of the input signal x(t) having 2048 complex time samples.

The autocorrelation ac(t) includes a sample representing a main peak corresponding to the main received signal. If multipath ghost signals are present in the received signal, then the autocorrelation ac(t) also includes other samples representing ghost peaks corresponding to respective ghost signals. The time displacement of a sample representing a ghost peak from the sample representing the main peak represents the time displacement of the corresponding ghost signal from the main signal, and the complex value of that ghost peak sample represents the magnitude and phase of the ghost signal.

In step 512, the DSP 306 locates the ghost peaks in the autocorrelation ac(t). The DSP 306 first normalizes the magnitude of each sample in the autocorrelation ac(t) to the magnitude of the sample representing the main peak. Then those samples with resulting normalized magnitudes above a threshold are identified as representing ghost signals. This threshold may be set at a fixed predetermined level, e.g. 12dB below the magnitude of the main peak. The threshold may also depend upon the quantization step size of the signal. In other words, the threshold must be lower when a larger symbol constellation is transmitted, i.e. a 256QAM system will require a lower threshold (thus, cancellation of weaker ghost signals), than a 32QAM system. Alternatively, the threshold may be varied in response to the current signal-to-noise ratio.

In step 514, the DSP 306 determines if there are any ghost signals represented in the autocorrelation ac(t). If there are none, then all the complex coefficients of the taps in the sparse IIR filter 24 and sparse FIR filter 26 are set to zero in step 516. Then the processing of the remainder of the receiver may continue, as illustrated in step 518.

If there are ghost signals represented in the autocorrelation ac(t), then they are dealt with in order from that represented by the sample having the largest magnitude to that having the smallest magnitude. Selecting the largest as yet unprocessed ghost peak representative sample, the DSP 306 must first decide if it is a pre-ghost or post-ghost. While an autocorrelation can identify the time displacement of a ghost signal from the main signal, and the magnitude and phase of that ghost signal, it does not indicate whether the ghost signal is a pre-ghost or postghost signal. This information may be inferred by heuristic methods, however. The inventors have realized that strong preghosts are unlikely more than 5 sec in advance of the main signal. Thus, peaks more than 5 sec from the main signal are most likely post-ghosts. In step 520, the DSP 306 makes a decision as to whether a ghost peak represents a pre-ghost or post-ghost based on the time displacement from the main peak. If it is less than 5 sec from the main signal, it is considered a pre-ghost, otherwise it is considered a post-ghost. The characterization of a ghost peak as representing a pre or post-ghost will be checked, and if necessary, corrected, in a following step (described below). It is also possible to design a fuzzy logic circuit, or expert system, to provide a characterization of a ghost peak as representing a pre or post-ghost.

In step 522, the sparse IIR filter 24 and sparse FIR filter 26 (of FIG. 2) are configured to cancel the ghost. If the ghost signal was characterized as a post-ghost in step 520, then a tap is allocated in the sparse IIR filter 24 having the same time displacement as that of the sample in the autocorrelation ac(t) representing the ghost signal from the sample representing the main signal. The value of the complex tap coefficient of the newly allocated tap is set to the negative of the complex value of the ghost signal sample in the autocorrelation ac(t). If the ghost signal was characterized as a pre-ghost in step 520, then a tap is allocated in the sparse FIR filter 26 having the same time displacement as that of the sample in the autocorrelation ac(t) representing the ghost signal from the sample representing the main signal. The value of the complex tap coefficient of the newly allocated tap is set to the negative of the complex value of the ghost signal sample in the autocorrelation ac(t).

In step 524, the remainder of the samples in the autocorrelation ac(t) are checked to determine if any of their magnitudes exceed the threshold. If so, then steps 520 and 522 are repeated for the largest as yet unprocessed ghost peak sample, as described above. If all the detected ghost signals have been processed, then the resulting sparse IIR filter 24 and sparse FIR filter 26 are tested in step 526.

If the sparse IIR filter 24 and sparse FIR filter 26 (of FIG. 2) are configured correctly, the output from the multipath equalizer 20 should include only the main signal, with all ghost signals attenuated. A cross correlation of such a signal with the input signal will include peaks only at the locations of the ghost signals. If, however, a pre-ghost were treated as if it were a post-ghost, or vice versa, then the cross correlation would include corresponding peaks on both sides of the main peak. The step 526 tests the resulting sparse IIR filter 24 and sparse FIR filter 26 by performing this cross correlation, and evaluating the result.

In step 527, the data capture buffer 302 (of FIG. 4) is commanded by the DSP 306 to extract and store 2048 samples from the input terminal 301 coupled to the input signal to the multipath equalizer 20 (of FIG. 2) and simultaneously to extract and store another 2048 samples from the input terminal 303 coupled to receive the output signal from the multipath equalizer 20, i.e. the signal which has been equalized to cancel ghost signals. Then the cross correlation of these two signals is calculated by the DSP 306. The cross correlation is calculated by steps 528–532, which are similar to steps 506–510, described above. In step 528, the samples representing the input signal to the filter x(t) are transformed into the frequency domain to produce the frequency spectrum X(F) by the DSP 306 performing an FFT on them; and the samples representing the output signal from the filter y(t) are transformed into the frequency domain to produce the frequency spectrum Y(F) by the DSP 306 performing an FFT on them. In step 530, the product of the input frequency spectrum X(F) and the complex conjugate of the output frequency spectrum Y*(F): X(F) Y*(F) is calculated by the DSP 306. In step 532, this product is then inverse transformed back into the time domain by the DSP 306 performing an FFT on the product, resulting in the time cross correlation cc(t).

In step 534, the resulting cross correlation cc(t) is checked by the DSP 306 in a similar manner as in steps 512 and 514, by normalizing the magnitudes of the samples to the magnitude of the sample representing the main peak. If the correct decision as to pre-ghost or post ghost signals was made in step 520, then there will be ghost peaks on one side only of the main peak at the time displacements of the previously detected ghost signals, as described above. In this case the processing by the remainder of the receiver may continue, as illustrated in step 536. If there are twin peaks on either side of the main peak at a time displacement of a previously detected ghost signal, then the characterization of that ghost signal as a pre or post-ghost was wrong, and, in step 538, the allocated tap is switched by the DSP 306 between the sparse IIR filter 24 and the sparse FIR filter 26. The operation of the sparse IIR filter 24 and sparse FIR filter 26 is tested again in step 526 until all ghost signals have been properly canceled.

As described above, in step 520 a decision is made as to whether a ghost signal represented by a peak sample is a pre or post-ghost. It is also possible to treat every ghost peak sample as if it were a post-ghost, and correct the characterization of the ghost signal to a pre or post-ghost in steps 526–538.

Figure 6:
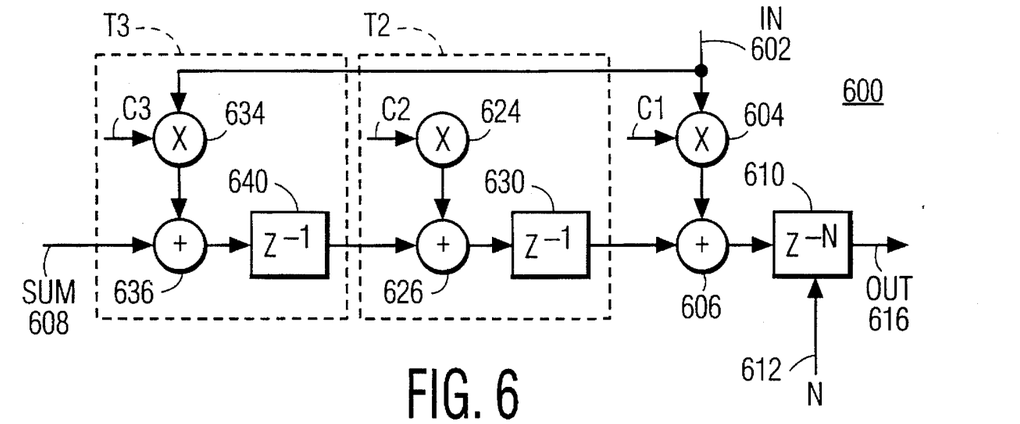
FIG. 6 is a logic diagram illustrating a filter section which may be used in the blind multipath equalizer illustrated in FIG. 2.

If a strong ghost signal is present, it is possible that a single tap allocated in either the sparse IIR filter 24 or sparse FIR filter 26 will not sufficiently cancel such a ghost signal. However, if a slightly modified filter section is used in the sparse IIR filter 24 and sparse FIR filter 26 (of FIG. 2), then stronger ghost signals may be more completely canceled. FIG. 6 is a logic diagram illustrating a filter section 600 which may be used as filter sections SEC1–SEC 3 in the sparse IIR filter 24 and/or filter sections SEC1–SEC4 in the sparse FIR filter 26.

In FIG. 6, the right hand portion-of the logic diagram illustrates a standard filter tap. A data input terminal 602 is coupled to the source of the signal to be filtered, which consists of successive complex valued samples. The input terminal 602 is coupled to a first input terminal of a complex multiplier 604. A second input terminal of the multiplier 604 is coupled to a source of a tap coefficient C1 for this tap. An output terminal of the multiplier 604 is coupled to a first input terminal of a complex adder 606. A summation input terminal 608 receives summation signals from previous filter taps. The summation input terminal 608 is coupled to a second input terminal of the adder 606 (through other elements, which will be described below). An output terminal of the adder 606 is coupled to a data input terminal of a variable delay element 610. A control input terminal 612 is coupled to a source of a time delay signal N for this tap. The control input terminal 612 is coupled to a delay control input terminal of the variable delay element 610. An output terminal of the variable delay element 610 is coupled to an output terminal 616 of the filter section 600. In a normal arrangement, the output terminal (616) of one section is coupled to the summation input terminal (608) of a subsequent section. The input terminals (602) are coupled in common to the source of the signal to be filtered. The filter controller supplies the tap coefficient (C1) and time displacement (N) to the tap in this section.

The modified filter section 600 further includes a second tap T2, including a multiplier 624, adder 626 and single clock delay element 630; and a third tap T3, including a multiplier 634, adder 636 and single clock delay element 640; both arranged in the same manner as the standard filter tap (604,606,610) described above. The three taps illustrated in FIG. 6 are coupled together to form a three tap filter section 600 which may be coupled with other such sections to form sparse IIR or FIR filters. By using IIR and/or FIR filters made up of sections 600 as illustrated in FIG. 6, strong ghosts may be sufficiently canceled in the following manner.

First, the process illustrated in FIG. 5 is performed, as described above. The coefficients generated by the FIG. 5 process are supplied to the multiplier 624 in middle tap T2 of each filter section 600 as the coefficient C2, and the coefficients of the adjacent sections, C1 and C3, are set to 0. The time displacement supplied to the variable delay element 610 in each filter section 600 is adjusted to account-for the single clock delay element 630. Then the output of the resulting multipath equalizer 20 (of FIG. 2) is further checked after completion of the process of FIG. 5. An autocorrelation is performed on the output signal from the multipath equalizer 20. The magnitudes of the samples in the resulting autocorrelation at time displacements immediately adjacent to those of the previously detected and corrected ghost signals are checked. If a strong ghost signal is present, the magnitudes of these adjacent samples may rise to a level above the threshold, and further cancellation of that ghost may be required.

Figure 7:
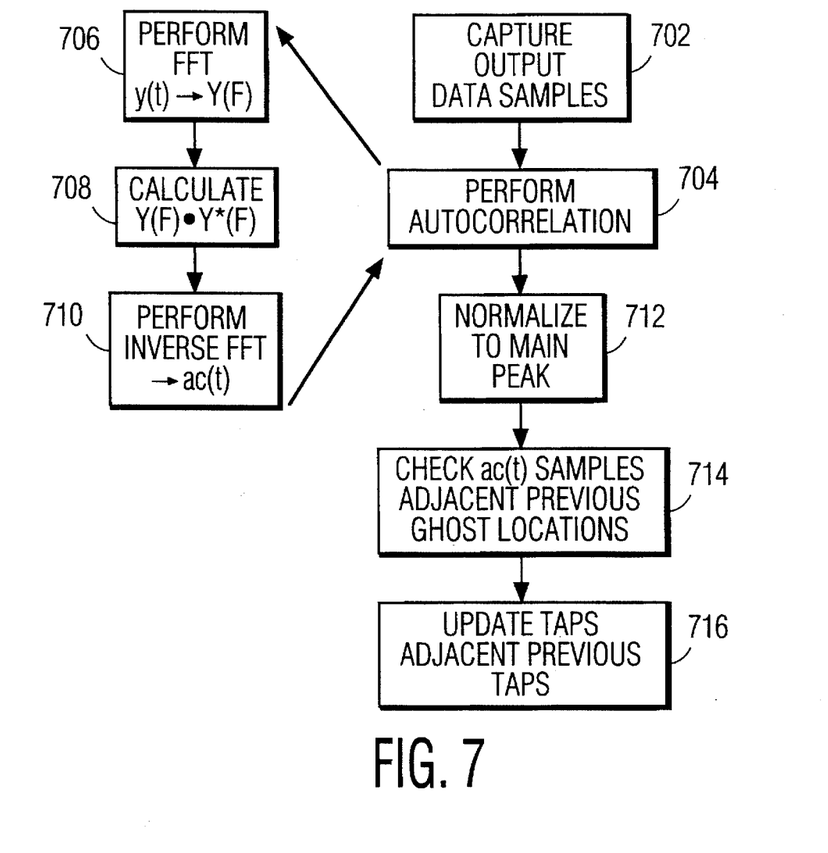
FIG. 7 is a flow diagram illustrating the process of operating filter sections as illustrated in FIG. 6.

FIG. 7 is a flow diagram illustrating the process of operating filter sections 600 as illustrated in FIG. 6 to attenuate strong multipath ghost signals. In step 702, the DSP 306 (of FIG. 4) commands the data capture buffer 302 to capture 2048 complex samples from the input terminal 303 coupled to receive the signal at the output of the multipath equalizer 20 (of FIG. 2). In step 704, the DSP 306 performs an autocorrelation of these samples. In step 706, the time domain output samples y(t) are transformed to the frequency domain by the DSP 306 performing an FFT on them to produce the frequency spectrum Y(F). In step 708, the product of the frequency spectrum Y(F), and its complex conjugate Y*(F): Y(F) Y*(F) is calculated by the DSP 306. Then this product is inverse transformed back into the time domain by the DSP 306 performing an FFT on it, to produce the time autocorrelation ac(t).

In step 712, the magnitudes of all the samples in the autocorrelation are normalized to the magnitude of the sample representing the main peak, corresponding to the main received signal. In step 714, the normalized samples immediately adjacent to the samples representing the previously detected and corrected ghost signals are checked. In step 716, if they exceed the threshold, then the complex values of those samples are supplied as coefficients C1 and C3 to the appropriate immediately adjacent taps of the corresponding filter section 600. Use of the adjacent filter taps further attenuates a strong ghost signal.

A multipath equalizer as described above will cancel ghost signals from a received signal even if they are displaced relatively far in time from the main signal. In addition, this multipath equalizer can respond quickly, and thus is effective at cancelling rapidly changing ghost signals, such as airplane flutter. This multipath equalizer does not require a training signal or a large DFE filter to perform these functions, however.

What is claimed is:

1. A blind multipath equalizer, comprising:

a source of a received signal including a highly random digital data signal;

a sparse digital filter, responsive to the received signal, and including a plurality of taps, each of said plurality of taps responsive to a tap coefficient and time displacement, for producing a multipath equalized digital output signal; and a filter controller, responsive to the received signal, including circuitry for calculating an autocorrelation of the received signal, detecting a multipath signal based on the autocorrelation, and supplying a tap coefficient and time displacement to one of the plurality of taps to cancel the detected multipath signal;

wherein the filter controller comprises:

a correlator, responsive to the received signal, for calculating the autocorrelation of the received signal, the autocorrelation having a main peak representing the digital data signal; and a tap control signal generator, responsive to the autocorrelation of the received signal, including circuitry for detecting said multipath signal by locating a peak in the autocorrelation, other than the main peak, representing a multipath signal, the multipath signal representative peak being displaced in time from the main peak and having a value, and supplying to the one of the plurality of taps a tap coefficient having a value equal to the negative of the value of the multipath signal representative peak and a time displacement having the value of the displacement in time of the multipath signal representative peak from the main peak.

2. The equalizer of claim 1 wherein the detecting circuitry in the tap control signal generator comprises:

circuitry for calculating the magnitude of the main peak;

circuitry for normalizing the magnitude of the autocorrelation to the magnitude of the main peak;

circuitry for comparing the normalized magnitude of the autocorrelation to a threshold; and circuitry for locating a peak in the autocorrelation when the magnitude of the normalized autocorrelation exceeds the threshold.

3. A blind multipath equalizer, comprising:

a source of a received signal including a highly random digital data signal;

a sparse digital filter, responsive to the received signal, and including a plurality of taps, each of said plurality of taps responsive to a tap coefficient and time displacement, for producing a multipath equalized digital output signal; and a filter controller, responsive to the received signal, including circuitry for calculating an autocorrelation of the received signal, detecting a multipath signal based on the autocorrelation, and supplying a tap coefficient and time displacement to one of the plurality of taps to cancel the detected multipath signal;

wherein the filter controller comprises:

a data capture buffer, responsive to the received signal, for extracting and storing a portion of the received signal in response to a control signal; and a signal processor, having a data input terminal coupled to the data capture buffer, including circuitry for producing said control signal to condition the data capture buffer to extract and store the portion of the received signal, retrieving the stored portion of the received signal from the data capture buffer, calculating an autocorrelation of the retrieved portion of the received signal, the autocorrelation having a main peak representing the digital data signal, detecting a multipath signal by locating a peak in the autocorrelation, other than the main peak, representing the multipath signal, the multipath signal representative peak being displaced in time from the main peak and having a value, and supplying to the one of the plurality of taps a tap coefficient having a value equal to the negative of the value of the multipath signal representative peak and a time displacement having the value of the displacement in time of the multipath signal representative peak from the main peak.

4. The equalizer of claim 3 wherein the circuitry for calculating an autocorrelation comprises:

circuitry for calculating the fast Fourier transform of the retrieved portion of the received signal to produce a spectrum corresponding to the retrieved portion of the received signal;

circuitry for multiplying the spectrum times the complex conjugate of the spectrum to produce a product;

circuitry for calculating the inverse fast Fourier transform of the product to produce the autocorrelation of the retrieved portion of the received signal.

5. The equalizer of claim 3 wherein the circuitry for detecting a multipath signal comprises: circuitry for calculating the magnitude of the main peak;

circuitry for normalizing the magnitude of the autocorrelation to the magnitude of the main peak;

circuitry for comparing the magnitude of the normalized autocorrelation to a threshold; and circuitry for locating a peak in the autocorrelation when the magnitude of the normalized autocorrelation exceeds the threshold.

6. The equalizer of claim 5 wherein the signal processor is a microprocessor.

7. The equalizer of claim 5 wherein the signal processor is a digital signal processor.

8. A blind multipath equalizer, comprising:

a source of a received signal including a highly random digital data signal;

a sparse digital filter, responsive to the received signal, and including a plurality of taps, each of said plurality of taps responsive to a tap coefficient and time displacement, for producing a multipath equalized digital output signal; and a filter controller, responsive to the received signal, including circuitry for calculating an autocorrelation of the received signal, detecting a multipath signal based on the autocorrelation, and supplying a tap coefficient and time displacement to one of the plurality of taps to cancel the detected multipath signal;

wherein the sparse digital filter comprises:

a sparse finite impulse response (FIR) filter having a data input terminal and a data output terminal producing the multipath equalized digital signal, and including a plurality of taps, each responsive to a tap coefficient and time displacement; and a sparse infinite impulse response (IIR) filter including a plurality of taps, each responsive to a tap coefficient and time displacement, and an adder having a first input terminal coupled to the received signal source, a second input terminal responsive to the plurality of sparse IIR filter taps and an output terminal coupled to the sparse IIR filter taps and the data input terminal of the sparse FIR filter.

9. The equalizer of claim 8 wherein the filter controller is further responsive to the multipath equalized digital output signal, and further comprises:

circuitry for, after detecting a multipath signal, characterizing the detected multipath signal as one of a pre-ghost signal and a post-ghost signal;

circuitry for supplying a tap coefficient and time displacement corresponding to a pre-ghost signal to one of the plurality of taps in the sparse FIR filter and a tap coefficient and time displacement corresponding to a post-ghost signal to one of the plurality of taps in the sparse FIR filter; and circuitry for, after supplying the tap coefficient and time displacement, calculating a crosscorrelation of the received signal with the multipath equalized digital output signal, detecting a multipath signal which was incorrectly characterized as one of a pre-ghost signal and a post-ghost signal based on the crosscorrelation, correctly characterizing the detected incorrectly characterized multipath signal, and correctly supplying a tap coefficient and time displacement corresponding to a corrected pre-ghost signal to the sparse FIR filter and a tap coefficient and time displacement corresponding to corrected post-ghost signal to the sparse IIR filter.

10. The equalizer of claim 9 wherein the circuitry for characterizing the detected multipath signal comprises circuitry for characterizing each detected multipath signal as a post-ghost signal.

11. The equalizer of claim 9 wherein:

the autocorrelation has a main peak representing the digital data signal;

the circuitry for detecting a multipath signal comprises circuitry for locating a peak in the autocorrelation, other than the main peak, representing said multipath signal, the multipath signal being displaced in time from the main peak;

the circuitry for characterizing the detected multipath signal comprises circuitry for characterizing the detected multipath signal as a pre-ghost if the multipath signal is displaced less than 5 sec in time from the main peak and characterizing the detected multipath signal as a post-ghost otherwise.

12. The equalizer of claim 9 wherein the circuitry for calculating a crosscorrelation comprises:

circuitry for extracting a portion of the received signal;

circuitry for extracting a portion of the multipath equalized digital output signal;

circuitry for calculating the fast Fourier transform of the portion of the received signal to produce a spectrum corresponding to the portion of the received signal;

circuitry for calculating the fast Fourier transform of the portion of the multipath equalized digital output signal to produce a spectrum corresponding to the portion of the multipath equalized digital output signal;

circuitry for multiplying the spectrum corresponding to the portion of the received signal times the complex conjugate of the spectrum corresponding to the portion of the multipath equalized digital output signal to produce a product;

circuitry for calculating the inverse fast Fourier transform of the product to produce the crosscorrelation of the received signal with the multipath equalized digital output signal.

13. The equalizer of claim 9 wherein the circuitry for detecting a multipath signal which was incorrectly characterized locates a peak in the crosscorrelation and comprises:

circuitry for calculating the magnitude of the main peak in the crosscorrelation;

circuitry for normalizing the magnitude of the crosscorrelation to the magnitude of the main peak;

circuitry for comparing the magnitude of the normalized crosscorrelation to a threshold; and circuitry for locating a peak in the crosscorrelation when the magnitude of the normalized autocorrelation exceeds the threshold.

14. A blind multipath equalizer, comprising:

a source of a received signal including a highly random digital data signal;

a sparse digital filter, responsive to the received signal, and including a plurality of taps, each of said plurality of taps responsive to a tap coefficient and time displacement, for producing a multipath equalized digital output signal; and a filter controller, responsive to the received signal, including circuitry for calculating an autocorrelation of the received signal, detecting a multipath signal based on the autocorrelation, and supplying a tap coefficient and time displacement to one of the plurality of taps to cancel the detected multipath signal;

wherein:

the sparse digital filter includes respective data input, data output, and summation input terminals, and each of the plurality of taps comprises:

a multiplier having a first input terminal coupled to the filter data input terminal, a second input terminal responsive to a tap coefficient and an output terminal;

an adder having a first input terminal coupled to the summation input terminal, a second input terminal coupled to the output terminal of the multiplier and an output terminal; and a variable delay element having a data input terminal coupled to the output terminal of the adder, an output terminal coupled to the filter data output terminal, and a delay control input terminal responsive to a time displacement; and a subset of the plurality of taps are serially coupled with a data output terminal of each one of the subset coupled to a summation input terminal of a successive one of the plurality of taps.

15. The equalizer of claim 14 wherein the multiplier is a complex multiplier and the adder is a complex adder.

16. A blind multipath equalizer, comprising:

a source of a received signal including a highly random digital data signal;

a sparse digital filter, responsive to the received signal, and including a plurality of taps, each of said plurality of taps responsive to a tap coefficient and time displacement, for producing a multipath equalized digital output signal; and a filter controller, responsive to the received signal, including circuitry for calculating an autocorrelation of the received signal, detecting a multipath signal based on the autocorrelation, and supplying a tap coefficient and time displacement to one of the plurality of taps to cancel the detected multipath signal;

wherein:

the sparse digital filter further comprises a plurality of filter sections, each section having respective data input, data output and summation input terminals, and including a plurality of filter taps, each tap having respective data input, data output, and summation input terminals, and comprising:

a multiplier having a first input terminal coupled to the tap data input terminal, a second input terminal responsive to a respective tap coefficient and an output terminal;

an adder having a first input terminal coupled to the tap summation input terminal, a second input terminal coupled to the output terminal of the multiplier and an output terminal; and a delay element having a data input terminal coupled to the output terminal of the adder, and an output terminal coupled to the data output terminal of the tap;

the delay element of at least one tap of each section is a variable delay element and further includes a delay control input terminal responsive to a respective time displacement;

the plurality of taps in each section are serially coupled with the tap data output terminal of each tap being coupled to the tap summation input terminal of a successive tap; and the plurality of sections in the digital filter are serially coupled with the section data output terminal of each section being coupled to the section summation input terminal of a successive section.

17. The equalizer of claim 16 wherein the multiplier is a complex multiplier and the adder is a complex adder.

18. The equalizer of claim 16 wherein:

each filter section has a middle tap;

the filter controller is further responsive to the multipath equalized digital output signal;

the supplying circuitry in the filter controller supplies the tap coefficient and time displacement to the middle tap of one of the plurality of sections; and the filter controller further includes circuitry for, after supplying the tap coefficient and time displacement to the middle tap of the one of the plurality of sections, calculating an autocorrelation of the multipath equalized digital output signal, the output signal autocorrelation having a main peak representing the digital data signal, detecting respective peaks in the output signal autocorrelation at times adjacent the time displacement representing the previously detected multipath signal, and supplying respective tap coefficients for filter taps adjacent the middle tap of the one of the plurality of sections.

19. The equalizer of claim 18 wherein the circuitry for calculating an autocorrelation comprises:

circuitry for extracting a portion of the multipath equalized digital output signal;

circuitry for calculating the fast Fourier transform of the retrieved portion of the received signal to produce a spectrum corresponding to the retrieved portion of the received signal;

circuitry for multiplying the spectrum times the complex conjugate of the spectrum to produce a product;

circuitry for calculating the inverse fast Fourier transform of the product to produce the autocorrelation of the retrieved portion of the received signal.

20. The equalizer of claim 18 wherein the circuitry for detecting respective peaks in the output signal autocorrelation comprises:

circuitry for calculating the magnitude of the main peak in the output signal autocorrelation;

circuitry for normalizing the magnitude of the output signal autocorrelation to the magnitude of the main peak;

circuitry for comparing the magnitude of the normalized output signal autocorrelation to a threshold; and circuitry for detecting a peak in the crosscorrelation when the magnitude of the normalized output signal autocorrelation exceeds the threshold.

\* \* \* \* \*